(Model.)

J. P. FULGHAM.
Fertilizer Attachment for Seeding Machines.

No, 240,691.                    Patented April 26, 1881.

Witnesses;
W. H. Knight
W. C. Chaffee

Inventor;
Jesse P. Fulgham.
By Hill & Church,
His Attys.

United States Patent Office.

JESSE P. FULGHAM, OF RICHMOND, INDIANA, ASSIGNOR OF ONE-HALF TO WAYNE AGRICULTURAL COMPANY, OF SAME PLACE.

FERTILIZER ATTACHMENT FOR SEEDING-MACHINES.

SPECIFICATION forming part of Letters Patent No. 240,691, dated April 26, 1881.

Application filed March 2, 1881. (Model.)

*To all whom it may concern:*

Be it known that I, JESSE P. FULGHAM, of Richmond in the county of Wayne and State of Indiana, have invented a certain new and useful Fertilizing Attachment for Seeding-Machines; and I do hereby declare the following to be a full, clear, and exact description of the same, reference being had to the accompanying drawings, forming a part of this specification, in which—

Figure 1:
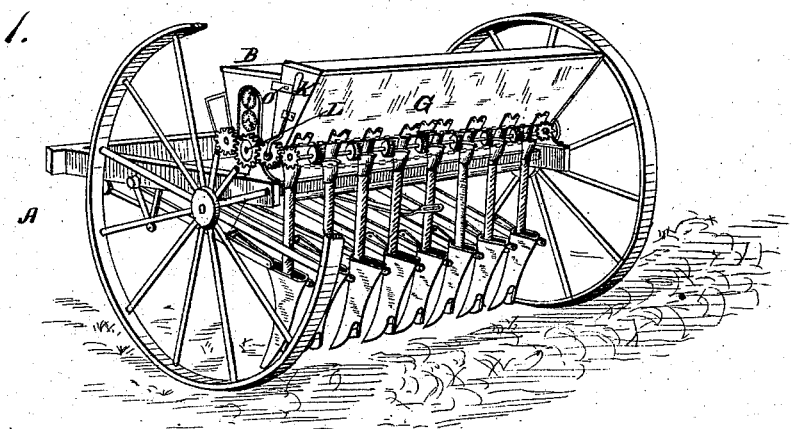
Figure 2:
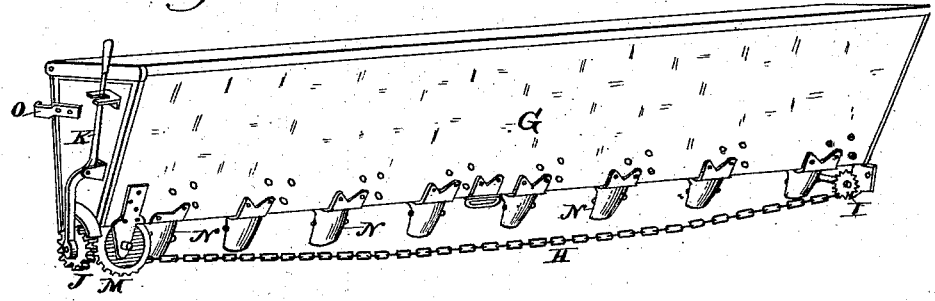
Figure 3:
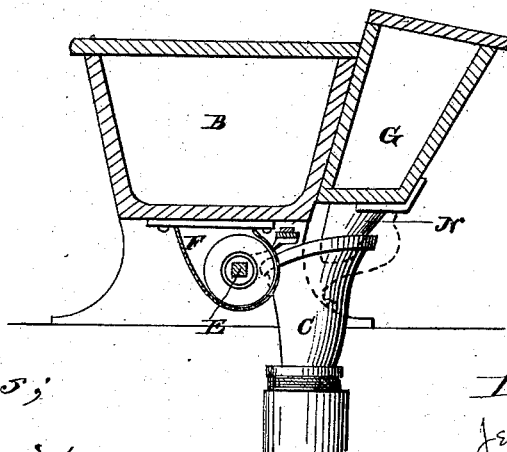

Figure 1 is a perspective view of a grain-drill with the fertilizing attachment applied thereto. Fig. 2 is a perspective view of the fertilizer attachment removed from the drill; and Fig. 3 is a transverse vertical section of the grain-drill and fertilizer-box, showing the grain and fertilizer spouts in elevation.

Similar letters of reference in the several figures denote the same parts.

My invention relates to that class of seeding-machines which are adapted to sow grain and fertilizers together in drills or furrows in the ground.

Heretofore such grain-sowing machines or "grain-drills," as they are termed, have been permanently combined with means for sowing the fertilizer in the same drill or furrow with the grain, the operative parts of both the grain-sowing and fertilizer-sowing devices being constructed and adapted to such permanent connection with each other. Several great disadvantages resulted from this construction, among which may be mentioned the following: A farmer not intending to immediately use artificial or pulverulent fertilizers would either be obliged to buy a combined grain-drill and fertilizer-sowing machine, only one part of which he would at present need, and the other part of which would be a useless load and incumbrance, or else, if afterward he should desire to use such fertilizers, he would then be compelled to abandon his old machine and purchase a new one at great cost. Again, a farmer having such combined machine would be obliged to haul the additional weight of the fertilizer-sowing devices about his farm, whether he desired to use it in connection with his grain-drill or not; and, thirdly, the fertilizer-box, being fastened permanently to the machine, could not be tilted or turned bottom up for the purpose of cleaning it, and without so reversing it it was almost impracticable to thoroughly cleanse it of the phosphates, as a result of which the metallic parts would soon corrode and get out of working order.

The object of my invention is to remedy these inconveniences and disadvantages, to which end the principle of my invention consists in so modifying and adapting the fertilizer-sowing devices as to enable them to be constructed and put into the market independently of the grain-drill machine, so that a farmer can buy and attach them to his grain-drills whenever he may need them, and may detach and remove them from his machine whenever he desires to use the grain-drill alone.

The drawings exhibit my fertilizing attachment applied to a well-known grain-drill extensively manufactured and used; but it is evident that the principle being here disclosed its application can readily be extended to the detachable connection of fertilizer attachments with other and different grain-drills, the general construction of all grain-drills being very similar. I do not, therefore, limit my invention to the combination of the detachable fertilizer-sower with, nor the adaptation of it to, any specific grain-drill, but claim it broadly in its adaptation to and combination with all grain-drills of substantially the same general form as that shown in the drawings. In all these uncombined grain-drills the grain is contained in a seed-box extending above and parallel to the main axle or axial line of the carriage-wheels. From this box it is fed to the grain spouts or tubes by means of revolving feed-wheels arranged on a shaft driven by an exposed pinion at one end of the box by power applied from the carriage-wheel. The feed-wheels drop the grain into tubes in rear of the seed-box, the upper ends of which tubes are open and are slightly below the level of the bottom of the seed-box. Through these tubes it falls into the furrows made in the ground by the drill-points. The seed-box or machine-frame furnishes me the means of supporting and attaching my fertilizer-box and its connected parts. The exposed pinion enables me to apply the power to the fertilizer-sowing devices, and the open upper ends of the drill-tubes or seed-tubes enable me to conduct the fertilizer to and mingle it with the grain in its descent to the furrows, and by availing myself of these devices of the grain-drill I am enabled to construct my fertilizing apparatus so that it can be attached or detached without any modification or adaptation of the ordinary grain-drill as now generally used.

In the drawings, A represents a grain-drill of which B is the seed box or hopper; C, the grain-receiving spouts or tubes; E, the feed-shaft driven by gearing from the axle of the machine, and F the seed-cups containing the feed mechanism, and to which the grain spouts or tubes are hung.

G is the fertilizer box or hopper, made of substantially the same length as the hopper of the grain-drill, and of suitable width and depth. Its interior may contain any suitable feeding mechanism adapted to agitate and feed pulverulent fertilizers; but I prefer to employ that for which Letters Patent of the United States of America were granted me dated April 29, A. D. 1879, No. 214,900, it being operated by means of a traveling chain, H, passing over a sprocket or other suitable driving wheels, I, at each end of the hopper.

J is a compound gear-wheel mounted upon a short stud projecting from one end of the fertilizer-hopper, and adapted to gear with the exposed pinion L of the feed-shaft on the grain-drill when the attachment is applied thereto. The beveled-gear rim on the side of the wheel J engages with the beveled gear M on the shaft of one of the sprocket-wheels, for the purpose of operating the chain of the fertilizer.

Openings in the bottom of the fertilizer-box admit the material that is fed through them to drop into the open tops of the grain-tubes C, either directly or through the medium of short conveyer tubes or spouts N N, attached to the box, the latter being the preferable construction. These openings or conveyer-spouts correspond in number and position to the grain-spouts beneath. When the conveyers N N are omitted the box should be so constructed and adapted to the machine that its bottom will come close to the top of the grain-tubes C, to prevent wasting the fertilizer; but when the conveyer-tubes or their equivalents are used the bottom of the box may be arranged higher, as shown in the drawings.

At one end of the box a shipping-lever, K, connected with the gear-wheel J, serves to slide said wheel on its stud for the purpose of engaging the gears J M with or disengaging them from each other, as it may be desirable either to operate or stop the fertilizer mechanism.

The fertilizer attachment thus constructed is applied at the rear side of the seed-hopper B, to which it is secured by metal clamps O O, bolted to the ends of the hopper G, and clasping the moldings on the ends of the seed-hopper. In applying the attachment, one of the clamps is loosened to permit its hooked front end to pass the moldings, after which it is screwed up to firmly lock the attachment in place. Instead of this fastening and support any other suitable equivalent means may be employed. The supports and fastenings, feed-openings for the fertilizer, and driving-wheel J are so adjusted to each other that when the box is locked in place by the former the feed-openings or conveyer-spouts, if used, will register with the open tops of the grain-tubes beneath, and the peripheral teeth on the wheel J will mesh with the teeth on the pinion L, thereby putting the fertilizer attachment at once into operative combination with the grain-drill without requiring any preliminary modification or adaptation of the latter machine.

The attachment can be disconnected from the machine as easily as connected to it.

In Fig. 1, I have shown a grass-seed hopper attached to the front of a grain-drill hopper; but this may or may not be used when the fertilizing attachment is employed.

I am aware that detachable devices for sowing grain broadcast have been combined with grain-drills; also, that detachable devices for sowing grass-seed broadcast have been combined with grain-drills; also, that a box has been divided by a longitudinal partition into two compartments, one for grain and the other for fertilizers, both compartments discharging into a common conveyer, whereby the grain and fertilizer were conveyed together into the grain-tubes of a drill, and these combinations and contrivances I do not claim as my invention. In contradistinction from these—

I claim as my invention—

The combination of the four following elements, to wit: first, a fertilizer-box adapted to be attached to or detached from a grain-drill at will; secondly, means for securing said box in place upon the grain-drill and permitting its independent removal therefrom when desired; thirdly, agitating and feeding devices adapted to feed fertilizing material from the box, and driven by a wheel arranged to gear, when the box is in place, with one of the driving-pinions of the grain-drill; and, fourthly, a series of discharge-openings or short conveyers corresponding in number and position to the seed-tubes of a grain-drill, and applied to or in the under side of the box so as to extend directly over the open upper end of the drill-tubes, whereby, when the attachment is applied to a grain-drill, the fertilizing material falls through each conveyer or feed-opening into the top of a drill-tube and mingles with the grain falling through said tube, all said elements being connected together in a single independent attachment adapted to be sold separately from the grain-drill, and to be applied thereto at will by the user, substantially as described.

The foregoing specification of my invention signed by me this 21st day of January, A. D. 1881.

JESSE P. FULGHAM.

Witnesses:
PHILIP S. GOODWIN,
E. A. ELLSWORTH.